United States Patent

Lenart

(10) Patent No.: US 10,036,682 B2
(45) Date of Patent: Jul. 31, 2018

(54) UNDERWATER DRAIN LEAKAGE DETECTION APPARATUS

(71) Applicant: Steve Lenart, West Palm Beach, FL (US)

(72) Inventor: Steve Lenart, West Palm Beach, FL (US)

( * ) Notice: Subject to any disclaimer, the term of this patent is extended or adjusted under 35 U.S.C. 154(b) by 0 days.

(21) Appl. No.: 14/757,265

(22) Filed: Dec. 10, 2015

(65) Prior Publication Data

US 2017/0167944 A1 Jun. 15, 2017

Related U.S. Application Data

(60) Provisional application No. 62/124,677, filed on Dec. 29, 2014.

(51) Int. Cl.
*G01M 3/20* (2006.01)
*G01M 3/22* (2006.01)

(52) U.S. Cl.
CPC .................... *G01M 3/226* (2013.01)

(58) Field of Classification Search
CPC ........... G01M 3/20; G01M 3/22; G01M 3/226
See application file for complete search history.

(56) References Cited

U.S. PATENT DOCUMENTS

| | | | | | |
|---|---|---|---|---|---|
| 4,566,313 | A | * | 1/1986 | Monten | G01M 3/04 116/264 |
| 5,065,690 | A | * | 11/1991 | Bontempo | G01M 3/20 116/264 |
| 5,734,096 | A | * | 3/1998 | McGuigan | G01M 3/02 73/49.2 |
| 6,637,258 | B1 | * | 10/2003 | Foreman | G01M 3/226 222/174 |
| 2005/0016261 | A1 | * | 1/2005 | Yoncuski | G01M 3/2815 73/40.5 R |
| 2014/0260548 | A1 | * | 9/2014 | Marino | G01M 3/02 73/40 |

* cited by examiner

*Primary Examiner* — Nguyen Ha

(57) ABSTRACT

An underwater drain leakage detection apparatus for a swimming pool is provided including an elongated pole and a housing connected to one end of the pole. A flexible leak detection tube is connected to the housing at a first end thereof and is in liquid communication with the inside of the housing. The housing is positioned over a suspected leak area below the surface of the water in the pool by suitable manipulation of the elongated pole by the pool leak specialist. A suitable dye substance then is inserted into the distal top or free end of the leak detection tube while the latter is positioned just below the surface of the swimming pool water by the leak specialist. The dye is observed from above the surface of the swimming pool water to determine whether there is a leak. If there is a leak in the area of the pool covered by the housing, the dye easily will be observed to move downward along the tube.

8 Claims, 3 Drawing Sheets

UNDERWATER DRAIN LEAKAGE DETECTION APPARATUS

RELATED APPLICATION

The present application claims priority for all purposes on and of my prior provisional application, Ser. No. 62/124,677, filed Dec. 29, 2014, entitled: Underwater Drain Leakage Detection Apparatus. By this reference, my provisional application, Ser. No. 62/124,677 etc., is hereby incorporated in and made part of this application.

BACKGROUND OF THE INVENTION

Field of the Invention

The present invention relates generally to leak detector devices and methods, and more particularly, to a novel apparatus for detecting unwanted leakage in swimming pools without requiring the person conducting the leak investigation to do so immersed underwater in the swimming pool.

Description of the Prior Art

It is well known in the swimming pool art to provide various devices for detecting leaks through cracks in the drain system of the pool or through cracks elsewhere in the pool structure. One known prior art solution is to place a dye in the pool water in the vicinity of the drain (or suspected crack) and to observe the motion of the dye. This usually requires entering the water of a filled pool and being submerged during the dye placement and observant process. U.S. Pat. No. 5,065,690 discloses such a process.

Because application or placement of the dye underwater in the pool is so inconvenient, other solutions have been proposed where the dye insertion device is supported on the end of a pole and the pole is used as an extension to locate the dye application process underwater in the vicinity of the expected leak. Examples of these latter devices are disclosed in U.S. Pat. Nos. 5,261,269 and 6,637,258, respectively. They suffer from the disadvantage however of rendering difficult visibility of the dye in the suspected leak area because the investigator is usually remotely located on the coping of the pool holding the distal end of the pole.

In U.S. Pat. No. 5,734,096, a pool leak detector apparatus is described where a floating funnel is connected via a tube to the end of a pole inserted in the pool water and the level of water in the floating funnel is observed. While this organization improves visibility of the leak detection process somewhat, using a floating funnel and observing the water level in the funnel is not precise, requires a relatively long period of time to detect slow leaks, and requires extra components including a tether to maintain the funnel in a reasonably stable position relative to pool structure and the person holding the pole.

In order to overcome the forgoing disadvantages of the prior art pool leak detection devices and/or methods, the present invention fully discloses in this specification a new and improved pool leak detection apparatus and method which can provide easy and rapid observance of a leak detection event without entering the water of the pool and being submerged, and wherein the apparatus contemplated is not only easy to use, but is easy to fabricate and therefore low in cost.

The foregoing desired characteristics are provided only by the unique underwater leak detection apparatus of the present invention as will be made apparent from the following description thereof. Other objects and advantages of the present invention over the prior art also will be rendered evident.

SUMMARY OF THE INVENTION

To achieve the foregoing and other objects and advantages, the present invention, briefly summarized, provides apparatus for detecting swimming pool leaks primarily occurring in the main drain system of the pool, and includes a telescoping pool pole which has a top end and a bottom end. The bottom end of the telescoping pool pole is connected to a sealer dome that has a deformable sealer dome gasket for forming a water-tight seal to the main drain of the swimming pool A leak detection tube is connected to the sealer dome and is in liquid communication with the inside of the sealer dome. The leak detection tube extends from the sealer dome at the bottom end of the telescoping pool pole to the opposed, top end of the telescoping pool pole through an axial constraining member intended to maintain the leak detection tube in close association with the pole, but to allow the leak detection tube to be axially adjusted up or down relative to the pole.

In use, the sealer dome is lowered over a pool main drain using the telescoping pole, and then the leak detection tube, which is adjustably attached to the pole and extends down and into the sealer dome, is positioned with its top end portion just below the surface of the pool water so it is easily visible. A conventional syringe may then be employed to inject dye into the top end of the leak detection tube and observed from a position above the surface of the pool water. If the dye remains still or relatively motionless, there isn't any leakage. If the dye begins to move down or along the leak detection tube, there is a leak somewhere between the main drain and the valve at the pool pump. The entire main drain system may thus be tested for leaks easily in a matter of seconds without needing to enter the pool water, and any telling motion of the dye is easily and distinctly observable.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is an object of the present invention to provide a new and improved underwater drain leakage detection apparatus which may be easily and efficiently manufactured and marketed.

It is a further object of the present invention to provide a new and improved underwater drain leakage detection apparatus which is of durable and reliable construction.

An even further object of the present invention is to provide a new and improved underwater drain leakage detection apparatus which is susceptible of a low cost of manufacture with regard to both materials and labor, and which accordingly is then susceptible of low prices of sale to the consuming public, thereby making such underwater drain leakage detection apparatus invention available to the buying public.

It is an object of the present invention to provide a new and improved underwater drain leakage detection apparatus that provides an easily visible indicator for showing whether a leak is present in the main drain system of a swimming pool.

It is a further object of the present invention to provide a new and improved underwater drain leakage detection apparatus that facilitates the application of dye to a leak detection tube just below the top water surface of a swimming pool.

Yet, another object of the present invention to provide a new and improved underwater drain leakage detection apparatus that facilitates observing dye inserted into to a leak detection tube positioned just below the top water surface of a swimming pool from an observation position or location above the top water surface of the swimming pool.

An even further object of the present invention is to provide a new and improved underwater drain leakage detection apparatus that facilitates the application of dye to a leak detection tube positioned just below the top water surface of a swimming pool wherein the leak detection tube is adjustably attached to a telescopic pole having a bottom, a drain sealer dome is attached to the bottom end of the telescopic pole, and wherein the leak detection tube is in fluid communication with the drain sealer dome.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENTS

Figures 1, 2:
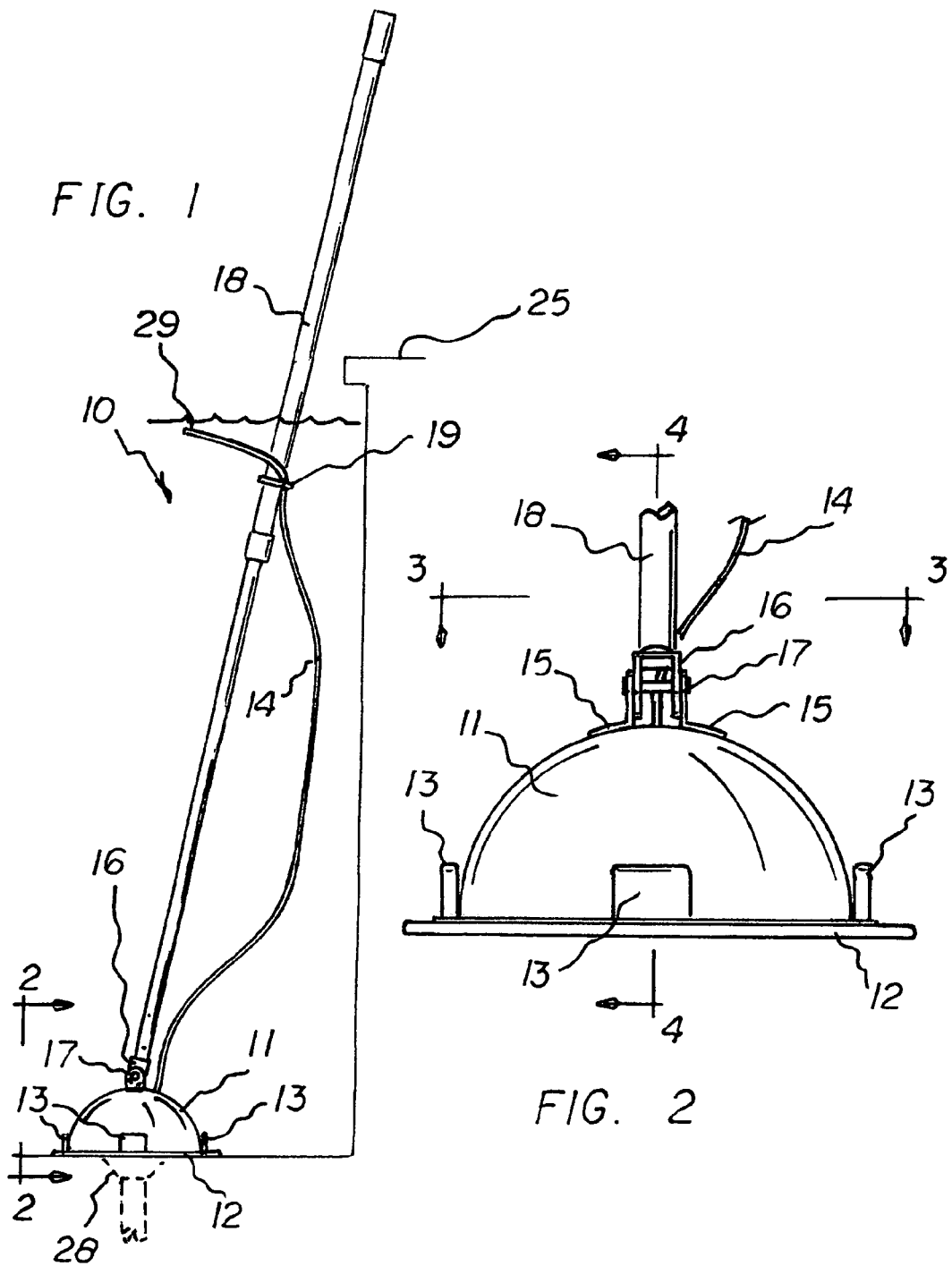
FIG. 1 is a side view showing a preferred embodiment of the underwater drain leakage detection apparatus of the invention, wherein the top end of the telescoping pool pole is located above the top surface of the water in a swimming pool, and the top end of the leak detection tube is located slightly below the surface of the water in the pool.
FIG. 2 is an enlarged front view of the embodiment of the underwater drain leakage detection apparatus shown in FIG. 1 taken along line 2-2 of FIG. 1.
Figure 3:
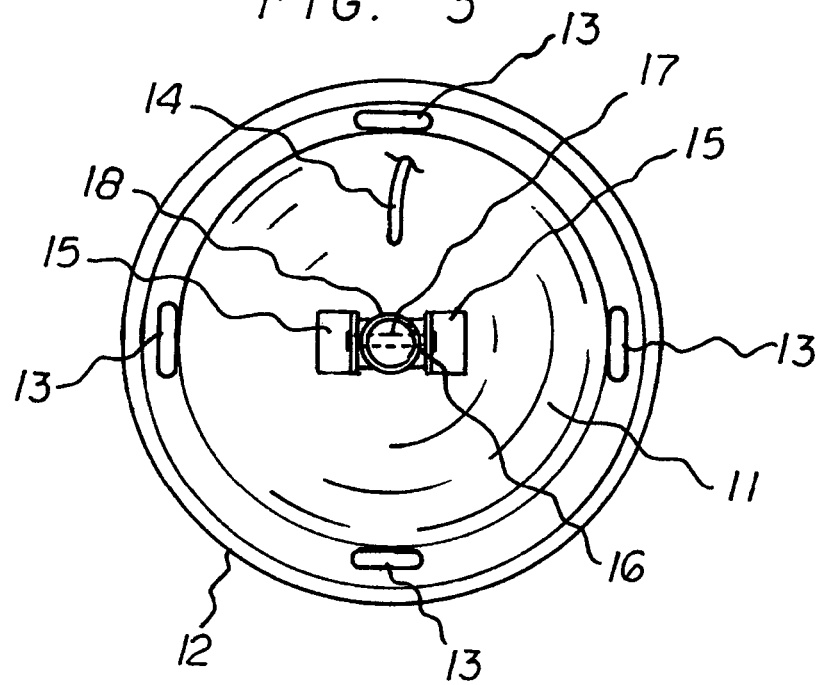
FIG. 3 is a cross-sectional view of the embodiment of the underwater drain leakage detection apparatus of FIG. 2 taken along line 3-3 thereof.
Figure 4:
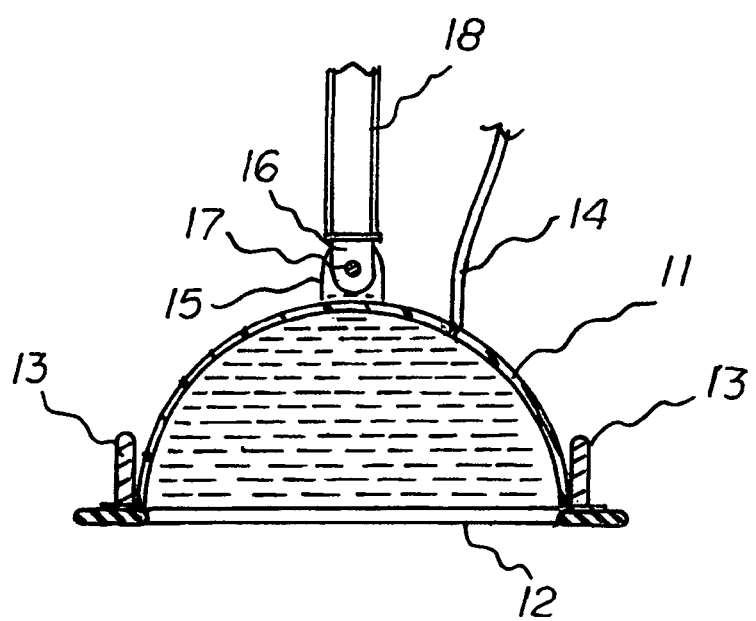
FIG. 4 is a cross-sectional view of the embodiment of the invention shown in FIG. 2 taken along line 4-4 thereof.

With reference to the drawings, a new and underwater drain leakage detection apparatus embodying the principles and concepts of the present invention will be described.

Turning to FIGS. 1-6, there is shown a preferred embodiment of the underwater drain leakage detection apparatus of the invention generally designated by reference numeral 10. In each of the figures, reference numerals are shown that correspond to like reference numerals that designate like elements shown in other figures.

In the preferred embodiment, the underwater drain leakage detection apparatus 10 primarily is intended to be used to detect water leaks from the swimming pool drain 28 and underlying pipes and plumbing. In this respect, the underwater drain leakage detection apparatus 10 includes a telescoping pool pole 18 which has a top end and a bottom end. The bottom end of the telescoping pool pole 18 is connected to a pool pole holder connector 16 which is connected to a pool pole holder pin 17 which is connected to a pool pole holder bracket 15. The pool pole holder bracket 15 is connected to a sealer dome 11 that has a deformable sealer dome gasket 12 for forming a water-tight seal in a location proximal to the swimming pool drain 28. The pool pole holder bracket 15 can be a rigid L-shaped bracket 15 that is solid. It is contemplated that the pool pole holder bracket 15 be made of durable, rot resistant material, such as, but not limited to, plastic or metal.

Preferably, weights 13 are supported by the sealer dome 11 to aid in the forming and maintaining of the water-tight seal with the swimming pool drain 28. The amount of weight employed may be varied to suit individual requirements.

A leak detection tube 14 is connected to the sealer dome 11 and is in liquid communication with the inside of the sealer dome 11 substantially as depicted. The leak detection tube 14 extends out of sealing dome and up along the bottom end of the telescoping pool pole 18 toward the upper portion of the pool pole 18. At or proximal to the upper portion or top of the telescoping pool pole 18, by using the underwater drain leakage detection apparatus of the invention, a leak detection specialist (not shown) can test the swimming pool drain 28 and associated plumbing for water leakage.

As shown in FIG. 1, the upper or top end portion of the telescoping pool pole 18 preferably extends above the swimming pool top water surface whereas the top end 29 of the leak detection tube 14 preferably is located or positioned immediately below the surface of the swimming pool 25, substantially as depicted. Therefore, the leak detection specialist does not have to personally enter the water in the swimming pool to conduct the drain leakage test as will become more evident below.

Because the telescoping pool pole 18 is in fact telescopic, the telescoping pool pole 18 can readily be adjusted for swimming pools of different depths. Such adjustable telescoping pole constructions are well known in the art, it being understood that the details of construction thereof are beyond the scope of the present invention. Suffice it to say, pole 18 may be increased or decreased in length by operating a tightening collar on the pole as is well known. Also, because the bottom of the telescoping pool pole 18 is connected to the sealer dome 11 by the pool pole holder pin 17 thereby permitting the sealer dome to pivot relative to the bracket 15, the leak detection specialist can readily place the sealer dome 11 over swimming pool drains 28 located at different positions on the swimming pool floor.

In the operation of the underwater drain leakage detection apparatus 10 of the invention, for a typical pool main drain 28 and main drain plumbing, a leak detection specialist would lower the main drain leak detection apparatus over the pool main drain cover at the bottom of the pool with the deformable sealer dome gasket 12 engaging the bottom of the pool to seal the swimming pool drain 28.

Figure 5:
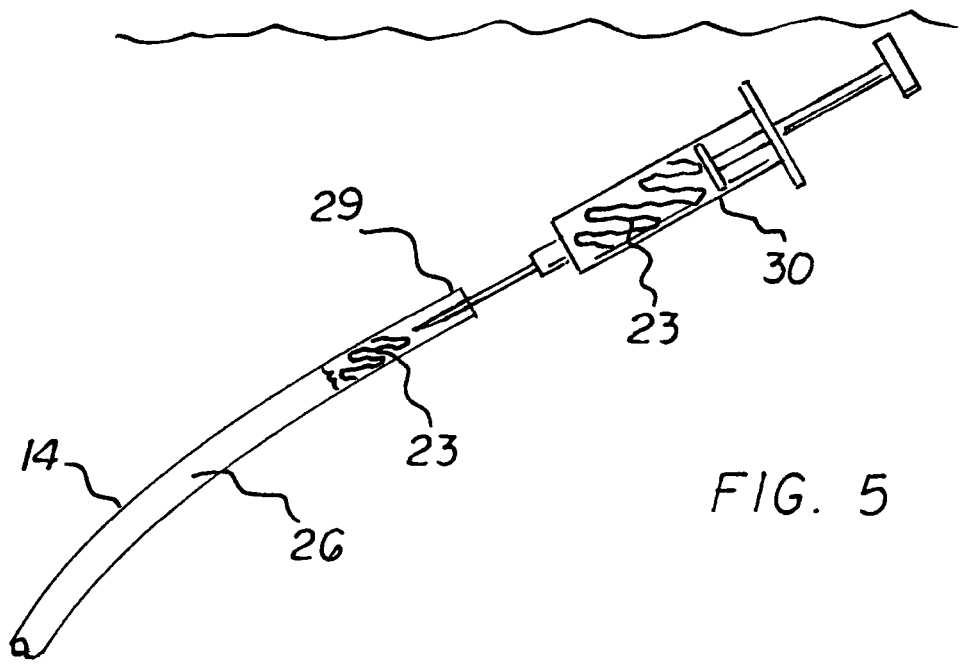
FIG. 5 is an enlarged view of the top of the leak detection tube which shows the application of dye material into the leak detection tube immediately below the surface of the pool water.
Figure 6:
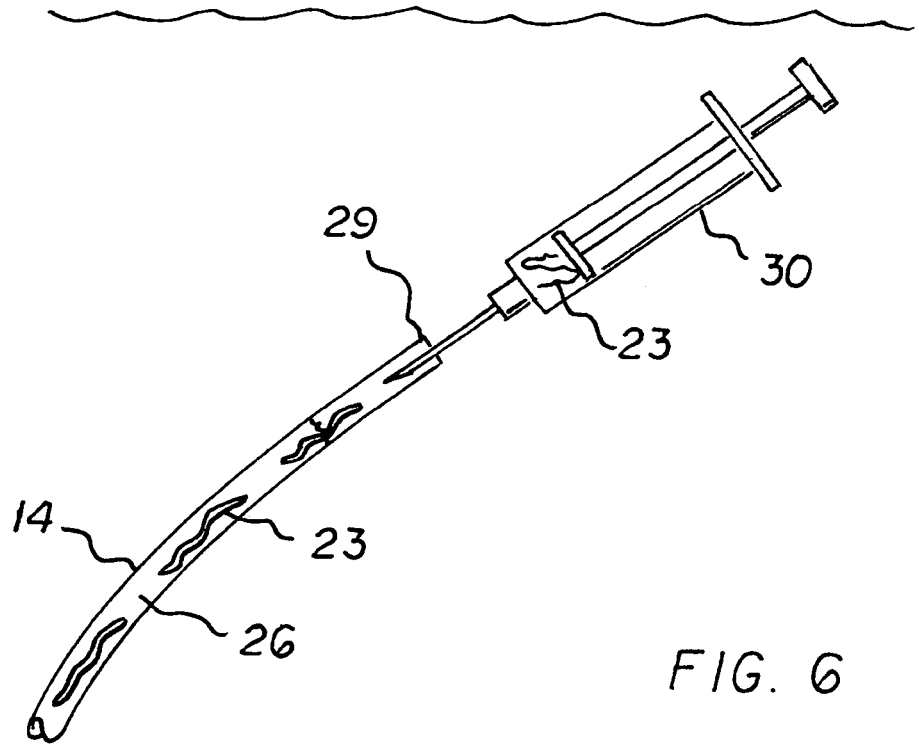
FIG. 6 is an enlarged view of the top of the leak detection tube which shows the application of dye material into the leak detection tube, and moving toward the sealer dome to the drain when there is a leak in the main drain.

The leak detection tube 14, which preferably is of flexible construction, is movably attached to the telescoping pool pole by a suitable connector 19 such that the leak detection tube 14 can be axially adjusted relative to the telescoping pool pole 18 so that the top end or portion 29 of the leak detector tube 14 lies just below the surface of the water (FIGS. 1, 5 and 6). In this regard, connector 19 which functions as a leak detection tube constraining member can be a simple strap, cable tie, ring or like fastener element suitably designed to allow the top end or portion 29 of the leak detection tube 14 to be slidably adjusted relative to the pool pole 18 within a predetermined range. This construction will facilitate positioning of the top end or portion 29 of the leak detection tube 14 immediately below the surface of the water of swimming pool 25, substantially as depicted in FIGS. 1, 5 and 6. It will be appreciated that connector or constraining member 19 maintains the leak detection tube 14 in close association with pole 18 during immersion of the pole 18 in the water of the swimming pool all of the while facilitating axial adjustment of the leak detection tube relative to the pool pole 18 as desired.

When the deformable sealer dome gasket 12 is placed in a water-sealing condition on the swimming pool drain 28, a column of water 26 will extend through the leak detection tube 14 and inside the sealer dome 11 to the swimming pool drain 28.

The leak detection specialist can then start the leakage test by injecting dye material 23 into top of water column 26 located just beneath the surface of the pool water. This can be done preferably by using a conventional syringe 30 and injecting the dye material 23 through the top end 29 of the leak detection tube 14, substantially as schematically depicted in FIG. 5.

At this start time, when the leakage test begins, if there is no water leakage in the swimming pool drain 28 and related plumbing, then the dye 23 will remain substantially stationary (not move) in the top end portion of the leak detection tube 14.

However, as shown in FIG. 6, if there is in fact water leakage in the swimming pool drain 28 and/or the underlying plumbing, then the injected dye 23 will perceptibly move within the leakage detection tube 14 in a direction toward the sealing dome 11. The lesser the traveling speed or velocity of dye movement, the lesser the drain leakage. Conversely, the greater the travel velocity of the dye in the top end portion of the leak detection tube, the greater the drain leakage. It thus will be appreciated that the use of the injected dye material 23 into the top portion of the leak detection tube 14 visually enhances any movement of the column of water 26 therein.

A preferred embodiment of the present sealer dome 11 is made of any moldable material and includes the deformable sealer dome gasket 12, weights 13, and the leak detection tube 14. Good results have been achieved with the thickness of the sealer dome 11 measuring between ⅛ and ⅜ inch thick. The body portion of the sealer dome 11 is formed in a generally circular configuration. Although good results have been achieved using a circular configuration, any shape can be used. The deformable sealer dome gasket 12 is made up of a deformable rubberized material. Although good results have been achieved utilizing a deformable rubberized material, it is contemplated to be within the scope of the invention that various materials could be used, so long as the user can obtain a seal that allows the main drain leak detection apparatus to work properly.

The telescoping pole 18 comprises an elongated, rigid generally cylindrical member that could be either tubular or solid. It is contemplated to be within the scope of the invention that the telescoping pool pole 18 is made of durable, rot resistant material, such as, but not limited to plastic or metal. The telescoping pool pole 18 is dimensioned to secure work to the pool pole holder connector 16 so that the telescoping pool pole 18 is readily secured to the main drain leak detection apparatus.

Although the telescoping pool pole 18 is shown to be generally cylindrical in shape, it is contemplated to be within the scope of this invention that various shapes can be utilized, such as to facilitate a user's ergonomic preferences. In the preferred embodiment, good results have been achieved having the telescoping pool pole measure approximately nine feet telescoping to 18 feet. It is contemplated to be within the scope of the invention that various poles could be used.

The pool pole holder connector 16 comprises a solid, rigid, tubular shape at one end and a V-shaped at the other end. It is contemplated that the pool pole holder connector 16 be made of durable, rot resistant material, such as, but not limited to plastic or metal. The pool pole holder connector 16 is dimensioned at the tubular end to secure to the telescoping pool pole and is dimensioned at the Y-shaped end to secure to the pool pole holder pin 17.

The pool pole holder pin 17 comprises a rigid tubular member that is solid. It is contemplated that the pool pole holder pin 17 be made of durable, rot resistant material, such as, but not limited to plastic or metal. In the preferred embodiment, good results have been achieved using a pin. Although good results have been achieved utilizing a pin, it is contemplated to be within the scope of the invention that various other objects could be used such as, but not limited to, a common nut and bolt. In the preferred embodiment, good results have been achieved utilizing L-shaped brackets. However, it is contemplated to be within the scope of the invention that any shape bracket could be used.

The leak detection tube 14 comprises a clear flexible tube. It is contemplated that the leak detection tube 14 be made of durable, rot resistant material, such as, but not limited to plastic. The length of the leak detection tube 14 made to conform to the length of telescoping pool pole 18 so that it can be attached to the telescoping pool pole just below surface of water. In the preferred embodiment, good results have been achieved having the leak detection tube be ¼ inch in diameter and 16 to 20 feet in length. Although good results have been achieved utilizing this diameter and length, It is contemplated that various diameters and length can be used.

The weights 13 are comprised of a heavy material. It is contemplated that the weights 13 be made of durable rot resistant materials, such as, but not limited to lead, lead pellets or any other weighting materials. Weights 13 size and shape are to conform to side of sealer dome 11. In the preferred embodiment, good results have been achieved utilizing square weights. Although good results have been achieved by utilizing square weights, it is contemplated to be within the scope of the invention that any size and shape or material can be used for the weights 13.

Although good results have been achieved utilizing the shape of the underwater drain leakage detection apparatus 10 as illustrated, it is contemplated to be within the scope of this invention that virtually any shape of main drain leak detection apparatus could be utilized so long as the main drain leak detection apparatus and deformable sealer dome gasket 12 are manufactured to permit a leak detection specialist to form an underwater seal over the opening that is being detected for leaks.

The main drain leak detection apparatus can also be utilized on pop up pool return heads that are located on the bottom of the pool or any other opening than the pool might have on the bottom with the main drain leak detection apparatus being lowered over said opening so that the deformable sealer dome gasket 12 engages the bottom of the pool around said opening.

Hence, it its broadest aspect the leak detection apparatus of the present invention comprises an elongated pole having a top end and an opposed bottom end, a housing (sealing dome) connected to the elongated pole at a bottom end thereof, a leak detection tube having a first end and an opposed second end, wherein the first end of the leak detection tube is connected to the housing so as to be in fluid communication with the housing, and wherein the leak detection tube second end comprises a distal free end extending proximal to the top end of the pole when the pole is immersed within the water of a swimming pool, and wherein a connector is provided affixing the leak detection tube to the pole such that the leak detection tube is attached to the pole and the distal free end of the leak detection tube is adjustably locatable relative to the top end of the pole.

By this novel apparatus, an important advantage of the invention is achieved, namely the distal free end of the leak detection tube can be supported under the surface of the swimming pool water so as to receive therein a dye substance, and the motion of the dye substance within the leak detection tube (if any) can be visually monitored from a position above the surface of the swimming pool water by the leak detection specialist or the like.

Generally, the components of the underwater drain leakage detection apparatus 10 of the invention can be made from inexpensive and durable wood, metal and/or plastic materials.

As to further details of the manner of usage and operation of the present invention, the same is apparent from the above disclosure, and accordingly, no further discussion relative to the manner of usage and operation need be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. For example, although the leak detection apparatus of the present invention is intended primarily to determine leaks in the main drain system of a swimming pool or the like, it will be apparent that the apparatus disclosed herein can be employed as well to identify and locate leaks occurring through cracks or other openings per se in the walls or floor of a swimming pool structure.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A swimming pool leak detection apparatus comprising:
    an elongated pole, said elongated pole having a top end and an opposed bottom end,
    a housing, said housing being connected to said elongated pole at the bottom end thereof,
    a leak detection tube, said leak detection tube having a first end and an opposed second end,
    wherein said first end of said leak detection tube is connected to said housing so as to be in fluid communication with said housing,
    wherein said leak detection tube second end comprises a distal free end extending proximal to said top end of said pole when said pole is immersed within the water of said swimming pool, and
    a connector, said connector affixing said leak detection tube to said pole whereby said leak detection tube is attached to said pole and said distal free end of said leak detection tube is adjustably locatable relative to said top end of said pole,
    wherein said connector comprises a ring member, said ring member circumferentially engaging both said leak detection tube and said elongated pole, said ring member being of the type whereby said leak detection tube is adapted to be slidingly adjustable relative to said ring member and said elongated pole such that said distal free end of said leak detection tube is positionable relative to the surface of the water in said swimming pool when said elongated pole is immersed in said swimming pool with said housing engaging a portion of the pool below the surface of the water in said swimming pool.

2. The apparatus of claim 1 wherein said elongated pole is a telescopic pole capable of having its length adjusted relative to the depth of water in a swimming pool.

3. The apparatus of claim 1 wherein said housing comprises a sealing dome, said sealing dome being attached to said elongated pole bottom end by a pivotal connector therebetween, and wherein said first end of said leak detection tube is connected to said sealing dome.

4. The apparatus of claim 1 further including a syringe for inserting a dye into said distal free end of said leak detection tube.

5. The apparatus of claim 3 wherein said sealing dome further includes a flexible sealing flange and weights for maintaining said sealing dome in position below the surface of the water in said swimming pool when said elongated pole is immersed in said swimming pool.

6. A method of detecting leaks in a swimming pool comprising the following steps:
    providing an elongated pole with an attached housing and a leakage leak detection tube attached to said housing and having an opposed distal free end, said elongated pole and said leak detection tube being slidingly connected together by a pole-to-tube connector, immersing said elongated pole into a swimming pool filled with water such that said housing is in position over a portion of said swimming pool below the surface of said water, positioning said distal free end of said leak detection tube below said surface of the water in said pool by slidingly adjusting a position of said leak detection tube connected to said pole via said pole-to-tube connector prior to inserting a dye into said distal free end of said leak detection tube, inserting a dye into said distal free end of said leak detection tube while said distal free end of said leak detection tube is positioned below said surface of said water in said pool, and observing the movement of said dye in said leak detection tube distal free end from a position above said surface of said water in said swimming pool.

7. The method of claim 6 including the further steps of:

providing a syringe for containing said dye, and inserting said syringe into said distal free end of said leak detection tube to insert said dye into said distal free end of said leak detection tube.

8. The method of claim 6 including the further step of:

immersing said elongated pole into said swimming pool filled with water such that said housing is in position over a portion of said swimming pool below the surface of said water comprising a drain cover of the swimming pool's main drain.

* * * * *